United States Patent [19]

Pearne

[11] 4,200,164
[45] Apr. 29, 1980

[54] CONTROL SYSTEM FOR MOPED MOTOR

[76] Inventor: Frank S. Pearne, c/o McNenny, Pearne, Gordon, Gail, Dickinson & Schiller, 1200 Leader Bldg., Cleveland, Ohio 44114

[21] Appl. No.: 916,951

[22] Filed: Jun. 19, 1978

[51] Int. Cl.² .................................................. B62K 11/10
[52] U.S. Cl. .................... 180/206; 180/221; 180/77 H
[58] Field of Search ............. 180/33 D, 33 C, 33 E, 180/19 R, 19 S, 77 H

[56] References Cited

U.S. PATENT DOCUMENTS

| | | | |
|---|---|---|---|
| 731,207 | 6/1903 | Nechlediel | 180/33 C |
| 1,191,287 | 7/1916 | Vaux | 180/33 D |
| 1,308,022 | 7/1919 | Christensen | 180/33 R |
| 2,031,881 | 2/1936 | Evinrude | 180/33 D |
| 2,409,887 | 10/1946 | Murphy | 180/33 D |
| 2,578,886 | 12/1951 | Isherwood et al. | 180/33 D |
| 3,190,386 | 6/1965 | Swinny | 180/19 S |
| 3,791,469 | 2/1974 | Prosser et al. | 180/19 H |
| 3,903,980 | 9/1975 | Darras | 180/33 D |

FOREIGN PATENT DOCUMENTS 254974  7/1926  United Kingdom .................. 180/33 D Primary Examiner—Joseph F. Peters, Jr.
Assistant Examiner—Donn McGiehan
Attorney, Agent, or Firm—Pearne Gordon Sessions

[57] ABSTRACT

A unit for power converting a bicycle including a carrier and a motor mounting bracket pivoted on the carrier. A control handle fixed to the bracket permits convenient manual manipulation of the bracket for controlling power transmission to a wheel of the bicycle. Various motor controls are carried on the control handle in a manner whereby their settings with respect to the motor are unaffected by movement of the control handle. The bracket, control handle, motor controls and motor are readily removable from the bicycle for such purposes as maintenance or security.

15 Claims, 4 Drawing Figures

CONTROL SYSTEM FOR MOPED MOTOR

BACKGROUND OF THE INVENTION

The invention relates to power-driven bicycles, and in particular to an attachment for converting a conventional bicycle into a power-driven unit.

Previous devices for converting bicycles and the like into power-assisted units have often been relatively complex in design, installation, and operation. In many instances, prior art designs have involved motor controls and clutching systems which relied on Bowden cables or the like mounted along circuitous paths on a bicycle frame. Such arrangements added to the expense of the unit and required individual attention each time the motor was mounted or removed. This attention included separate mounting, removal, and/or adjustment whenever the motor was installed or removed for whatever reason. Oftentimes, prior motor conversion units have required welding brackets to the frame of a bicycle or other major modification of the frame.

Specially designed motors or motor housings proposed in the past for bicycle power conversion have been relatively expensive, due to limited manufacturing volume. Previous conversion units which utilized standard motor designs have been somewhat bulky and/or heavy, thereby adding significantly to the effort required to manually pedal and otherwise handle the bicycle. Known power conversion units which are adapted to drive the front wheel of a bicycle, although generally simplified in their control by virtue of being in arm's reach for direct control, are usually both noisy and noxious to the rider, who must trail the motor.

SUMMARY OF THE INVENTION

The invention provides apparatus for retrofitting a conventional bicycle with a power drive having a simplified motor control system. The disclosed apparatus, including the motor control system, provides convenient full control over a rear-mounted motor. The apparatus is readily installed with a minimum of skill and labor. This simplified installation results from a novel control system for remotely operating a throttle, choke, and ignition switch. The control system is integrated on a single control handle, and requires no adjustment or critical alignment procedures. The invention thereby makes it practical for the ultimate user or consumer to accomplish the installation at considerable savings in labor costs or minimizes the labor costs incurred by a retailer. The various parts of the disclosed motor control system, additionally, are economical to manufacture and simple to assemble.

In accordance with an important aspect of the invention, there is provided a manual dual function control element which operates both the motor ignition switch and a latch for releasing the control handle which develops a power-transmitting relationship between the motor and bicycle wheel. In one position, the dual function control element shifts the ignition switch to its "on" state and shifts the latch to a state permitting power transmission. In the other position, however, the dual function control element shifts the ignition switch to its "off" position but allows the latch to remain in the power transmitting state to effect compression braking of the bicycle.

The motor mounting apparatus of the invention, in addition to permitting effective implementation of the described simplified control system, is simple in construction, low in weight, and readily adapted to existing commercial motor designs. Still further, the motor mounting and control apparatus is organized to permit removal of the motor in a manner simple enough to make removal practical not only for maintenance but also as a precaution against vandalism, theft, or exposure to the elements. Removal is accomplished without tools by simply pulling out a detented pin and unhooking a biasing spring.

DESCRIPTION OF THE PREFERRED EMBODIMENT

Figure 1:
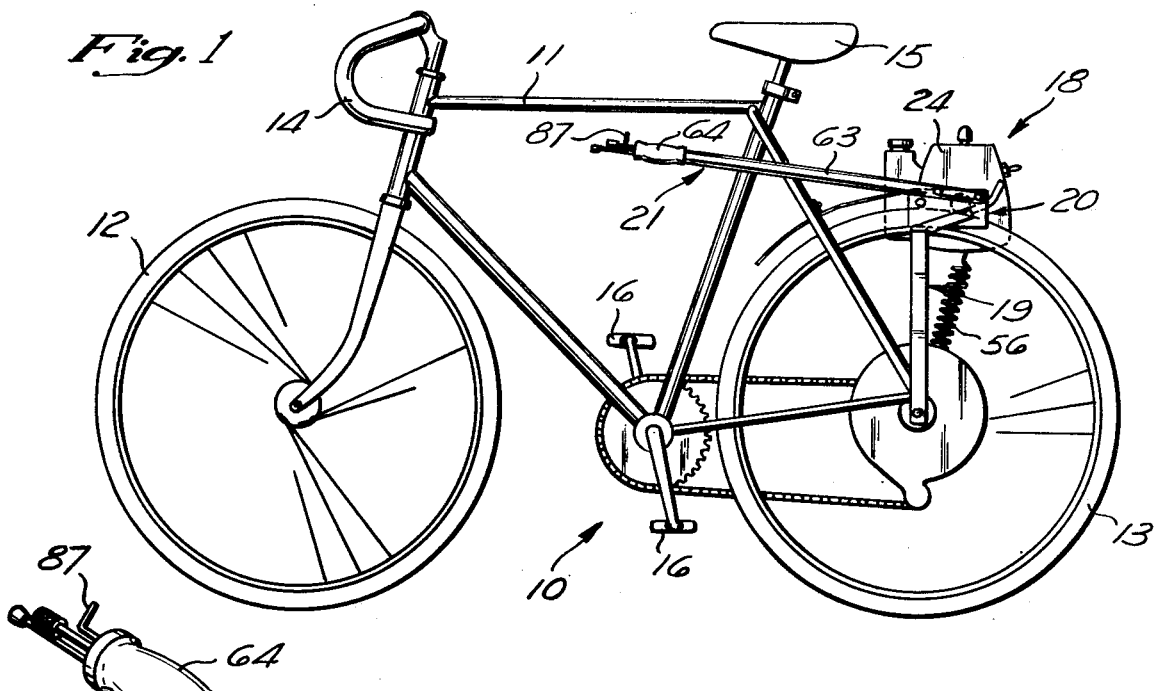
FIG. 1 is a side view of a bicycle having mounted thereon a power conversion unit constructed in accordance with the invention.

A conventional bicycle 10 includes a frame indicated generally at 11, front and rear wheels 12, 13, handlebars 14, a seat 15, and pedals 16. The illustrated bicycle 10 is a lightweight, multispeed unit of usual construction.

A motor conversion unit 18 in the illustrated embodiment principally comprises a motor carrier assembly 19, a motor mounting bracket 20, a control handle assembly 21 and a motor 24. The various components of the carrier assembly 19, mounting bracket 20, and handle assembly 21 are, for the most part, fabricated of steel or other suitable structural metal.

Figures 3, 4:
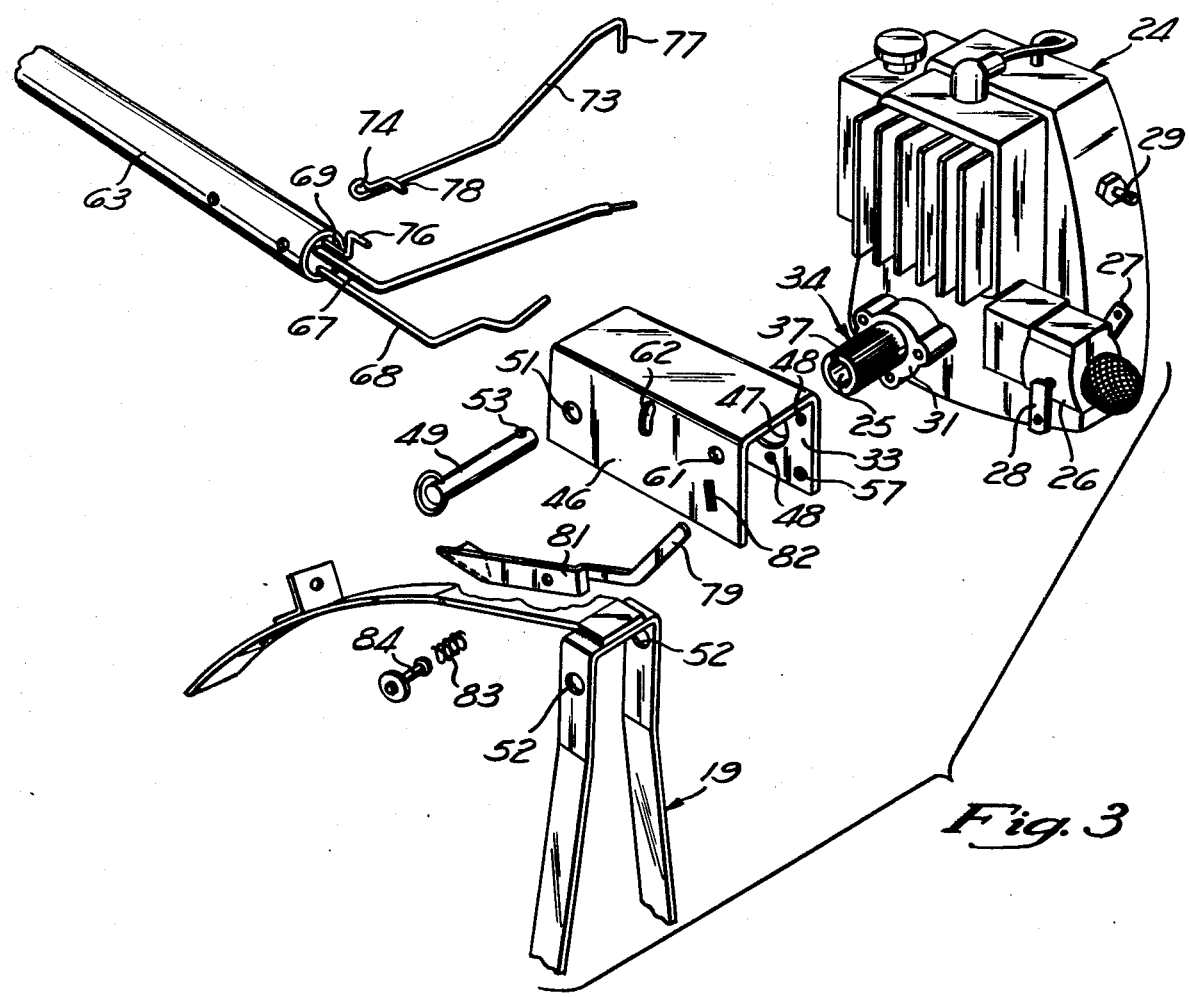
FIG. 3 is an exploded view of most of the parts illustrated in FIG. 2.
FIG. 4 is a rear elevational view of the power conversion unit and its relationship with a rear wheel of the bicycle.

The motor 24 of the conversion unit 18 is an internal combustion engine, preferably of a single cylinder, two-cycle type, arranged to operate with its power output shaft or crankshaft 25 rotating about a horizontal axis. The motor 25 includes a carburetor 26 with choke and throttle controls 27 and 28, respectively, and an ignition switch 29 controlling the output of a magneto in a conventional manner. A crankcase flange 31 extending radially of the shaft 25 is fixed to a sidewall 33 of the inverted, U-shaped mounting bracket 20 by a plurality of bolts. As viewed in FIGS. 1 and 3, the motor runs in a clockwise direction. A friction wheel 34 is locked on the crankshaft 25 by a setscrew 36 (FIG. 4). The friction wheel 34 is a cylindrical element having its outer peripheral surface knurled at 37 for efficient driving of the bicycle wheel 13 when in engagement therewith.

The motor mounting bracket 20 is adapted to be pivotally pinned to the motor carrier assembly 19. The carrier assembly 19, in turn, is bolted to the bicycle frame by disposing the axle of the rear wheel within holes 39 in the lower ends of a pair of depending straps 41 and retaining these straps with suitable nuts on the axle. The carrier assembly 19 is stabilized front to back by an arcuate strap 42, welded at a rear end to the straps 41. The arcuate strap 42 is secured to the caliper brake bracket or fender mounting bracket on the rear fork of the bicycle frame by selecting an appropriate hole 43 and assembling a bolt through it and the brake bracket.

The motor mounting bracket 20 is preferably fabricated from a rectangular plate having a number of holes or slots punched therein and being bent into the illustrated rectangular, U-shaped configuration. The bracket 20 includes a sidewall 46 opposite the motor mounting sidewall 33 and an intermediate web or bight 47. A relatively large circular hole 47 is formed in the bracket sidewall 33 to receive the friction wheel 34 therethrough. Bolts (not shown) are inserted through holes 48 and are threaded into the motor flange 31 to retain the motor to the bracket. The various parts are dimensioned such that the friction wheel 34 is disposed approximately midway between the sidewalls 33 and 46 of the bracket 20. The bracket 20 is removably secured to the carrier 19 by and is pivotal on a cylindrical pin 49. With the bracket 20 positioned over the carrier straps 41, the pin 49 extends through aligned holes 51 and 52 in the bracket and carrier, respectively. The pin 49 is retained with the bracket 20 by a spring-loaded ball 53 on its periphery adjacent its lead end. The construction and function of this ball or detent 53 on the pin 49 are well known in the prior art. The pin 49 allows the bracket 20 to pivot on a horizontal axis parallel to the axis of the associated bicycle wheel 13. The geometry of the bracket 20 is such that pivotal movement on the pin 49 produces movement of the friction wheel 34 towards or away from the associated bicycle wheel 13. The pin 49 is inserted into and out of the bracket and carrier holes 51, 52 without the use of tools by merely applying a moderate axial force on the pin to overcome the limited resistance to axial movement developed by the detent ball 53 when it is required to pass through these holes.

One end of a tension spring 56 is hooked into a hole 57 in the bracket 20, while the opposite end of the spring is hooked in a hole 58 near the lower end of an adjacent strap 41. The spring 56 resiliently biases the friction wheel 34 towards the rear wheel 13 by tending to pivot the bracket 20 about the pin 49.

The control handle assembly 21 is bolted to the bracket 20 with bolts 59 extending through a hole 61 and a slot 62 (FIG. 3) in the bracket sidewall 46. The control handle assembly 21 extends forwardly alongside the bicycle frame 11 from the bracket 20 at a point above the rear wheel 13 to a point below the seat 15 and slightly forward of the seat post so that it is well within a zone of convenient hand reach for the rider. The final height of the free end of the handle assembly 21 relative to the frame 11 is determined by adjustment of the associated bolt 59 in the bracket slot 62. The handle assembly 21 includes a rigid handle 63 fabricated from a straight length of round tubing. The free end of the handle 63 is fitted with a hand grip 64, which may be of elastomeric material for hand comfort. At the motor end, the tubular handle 63 is internally fitted with a circular plug 66.

Three elongated rigid control rods 67, 68, and 69 extend longitudinally inside the handle 63 and project from each end thereof. A radial end wall of the hand grip 64 and the plug 66 are provided with suitable longitudinally extending holes for supporting the rods 67-69 for either push-pull longitudinal or rotary movement within the handle 63. The rods 67-69, which are substantially straight within the handle, are supported by the hand grip 64 and plug 66 in locations which are free of interference with the handle-mounting bolts 59. Rearward ends 71 and 72 of the control rods 67,68 respectively are offset laterally and are connected directly to the choke and throttle levers 27,28, respectively. These levers 27,28 are provided with holes in which the rods 67,68 are inserted. Any degree of vertical movement required of the rod ends 71,72 at these levers 27,28 is accounted for by a slight rotation of these rods in the handle 63 about their longitudinal axes and a limited degree of clearance in the lever holes within the rod diameters. Rotation of the third rod 69 in the handle 63, through an associated, transverse rod link 73, controls the ignition switch which is in an "off" position in the view of FIG. 4. Each rod 67-69 is provided with a different forward end configuration adjacent the hand grip 64 to enable such ends to be readily distinguished visually and tactilely from one another.

As indicated most clearly in FIG. 3, the transverse link 73 is a multiplane bent rod having an eyelet 74 for connection with an offset crank 76 of the control rod 69 and a hook 77 for insertion into a suitable hole in the toggle pin of the ignition switch 29. An offset portion 78 of the transverse link 73 abuts an end 79 of a latch bar 81.

Figure 2:
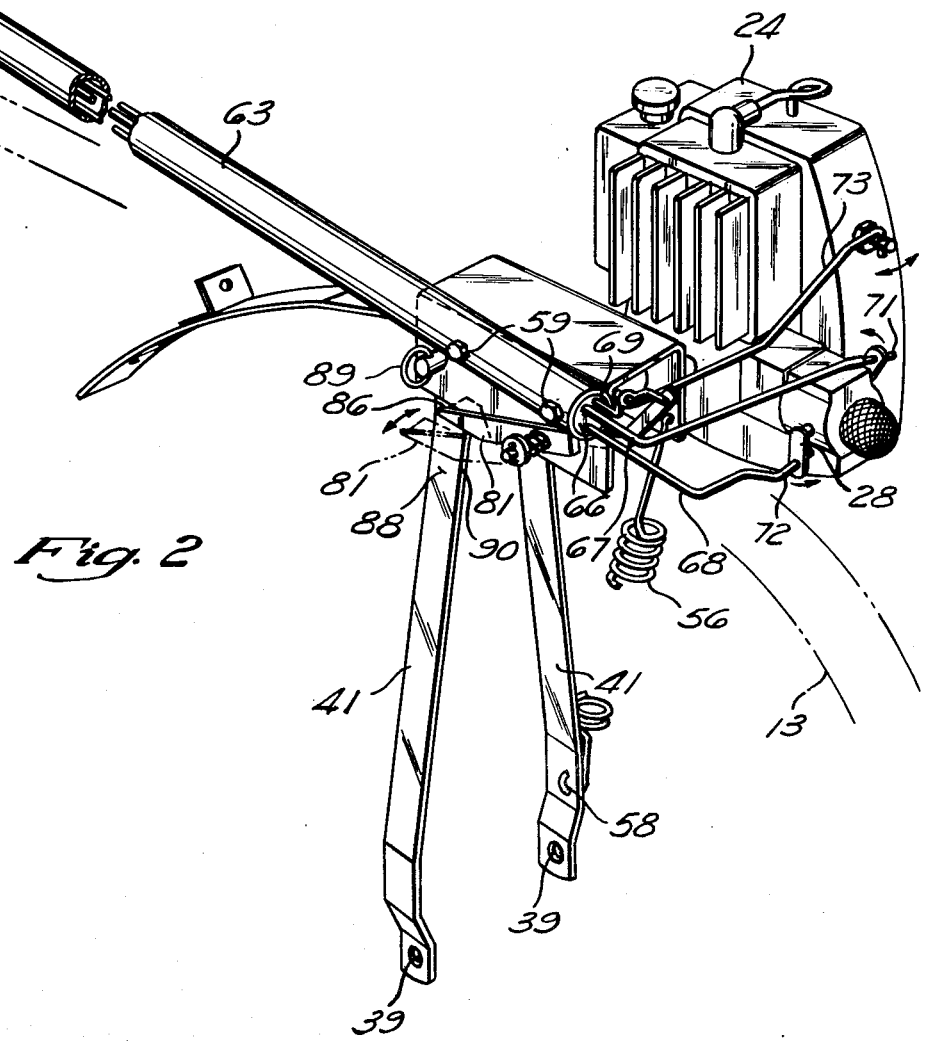
FIG. 2 is a perspective view, on a somewhat enlarged scale, of the power conversion unit of FIG. 1.

The latch bar 81 extends through a slot 82 in the bracket sidewall 46 and pivots in this slot about a generally vertical axis between the phantom and solid line positions of FIG. 2. The latch bar 81 is resiliently biased to the solid line position of FIG. 2 by a compression spring 83 captured on the outer end of a pin 84 extending through the bracket sidewall 46 and latch bar 81.

A power-transmitting relationship between the rear wheel 13 and the friction wheel 34 is established or avoided by moving the control handle assembly 21 up or down respectively to pivot the bracket 20 about the pin 49. Such movement is accomplished manually by hand engagement with the grip 64 and either overcoming the force of the spring 56 and weight of the motor 24 to lower the handle or allowing their forces to raise the handle. Upon depression of the handle assembly 21, the latch 81 is effective to move to its solid line position (FIG. 2) under the influence of the spring 83 and maintain the bracket 20 in a position where the friction wheel 34 is out of engagement with the bicycle wheel 13. This power disengagement position of the bracket 20 results from abutment of a forward edge 86 of the latch bar 81 against an adjacent mounting strap 41.

When it is desired to use the power of the motor 24 to propel the bicycle, the latch 81 is manually shifted from the power disengaging, solid line position of FIG. 2 to the phantom line power-transmitting position by first slightly manually depressing the handle assembly 21 to unload the force of the spring 56 and weight of the motor 24 from the latch surface or edge 86, and then by rotating the associated control rod 69 through manipulation of its offset forward end, designated 87. Resulting displacement of the transverse link 73, through abutment of its offset portion 78 with the adjacent end 79 of the latch 81, causes the latch to move laterally out of engagement with the strap 41. Simultaneously, the ignition switch 29 is shifted to the "on" position by the link 73.

The control handle 21 is thereafter allowed to rise, bringing the friction wheel 34 into contact with the bicycle wheel 13. The motor 24, with suitable settings of the choke and throttle levers 27,28 determined by the longitudinal positions of the associated control rods 67,68, can be started with the bicycle 10 in motion by transfer of power from the bicycle wheel to the motor. Once running, the motor 24 can propel the bicycle with or without the assistance of the rider. Coasting with the motor 24 running may be accomplished by depressing the handle assembly 21 to a point where the friction wheel 34 disengages the wheel or further to where the latch 81 is enabled to snap off the face, designated 88, of the strap 41 into engagement with the adjacent strap edge, designated 90.

In accordance with an important aspect of the invention, the motor 24 can be used to compression-brake the bicycle by leaving the friction wheel 34 in engagement with the bicycle wheel 13 and shifting the ignition switch 29 to an "off" position. The arrangement of the transverse shifting rod 73 permits movement of the ignition switch 29 between the "off" and "on" positions without requiring a corresponding movement of the latch from its power-transmitting position. This partial independence of the state of the latch 81 from the position of the control rod 69 and switch 29 is achieved by limiting the connection between the transverse link 73 and the latch 81 to an abutting contact capable of developing an operative pushing force in substantially only a single direction, i.e., to the right in FIG. 4.

It will be appreciated that the motor is readily removed from the bicycle by simply manually pulling the detented pin 49 in a direction along its axis by means of a wire finger loop 89 to permit complete separation of the motor mounting bracket 20 from the carrier assembly 19. The spring 56 is unhooked from the lower hole in the adjacent strap 41. Since the control handle assembly 21 is thereby removed in this operation, there is no need to disassemble, and then later reassemble, the connections of the various carburetor and ignition controlling elements. Such an arrangement makes removal of the motor quite practical for any purpose, such as maintenance or security.

Although a preferred embodiment of this invention is illustrated, it is to be understood that various modifications and rearrangements of parts may be resorted to without departing from the scope of the invention.

What is claimed is:

1. A motor mounting and control device for a bicycle comprising bracket means adapted to be removably secured to a bicycle frame, a motor carried on said bracket means and adapted to propel the bicycle through one of its wheels, a motor control handle mounted on said bracket means, said motor control handle being adapted to extend from the area of the motor and terminate with its end at a zone generally adjacent the body of the rider for convenient hand engagement of such handle end, a plurality of primary motor control rods including a throttle control rod extending along the handle from the motor and terminating at said zone adjacent the rider, said rods being independently movable on said handle between at least two settings, said control rods each being separately operably connected to said motor, said handle and removable bracket means providing the sole support for said motor control rods along their length between said motor and said zone whereby installation and removal of said bracket and motor on the frame of the bicycle automatically accomplish the same for the motor control rods.

2. The device of claim 1, wherein said bracket means includes means for pivotally mounting said motor relative to the bicycle frame, power transmitting means associated with the motor and adapted to drive a wheel of the bicycle, said power transmitting means being constructed and arranged to engage and disengage from a power transmitting relationship with the wheel upon pivotal movement of the motor, said handle being constructed and arranged with respect to said pivotal mounting means to pivot said motor when said handle is manually pivoted, said handle being fixed with respect to said motor whereby the spatial relationship between the handle and motor remains unchanged throughout pivotal movement of said handle and the settings of said control rods are thereby unaffected by such pivotal movement of said handle.

3. A device as set forth in claim 2, wherein said handle is an elongated tube, said control rods being disposed within said handle tube.

4. A device as set forth in claim 3, wherein said control rods include at least one rod mounted for push-pull movement in said handle tube and at least one rod mounted for rotation about its longitudinal axis in said handle tube.

5. A device as set forth in claim 2, wherein said power transmitting means includes friction drive means between the motor and the wheel.

6. A device as set forth in claim 5, wherein said pivotal mounting means is constructed and arranged to cause said motor to move towards or away from the bicycle wheel upon pivotal movement of said handle.

7. A device as set forth in claim 6, wherein said motor includes a power output shaft, a friction wheel fixed to said shaft, said motor shaft and pivot means being arranged with respect to one another such that manual manipulation of the handle is effective to directly engage and disengage the friction wheel with the bicycle wheel.

8. A device as set forth in claim 2, wherein said pivot mounting means comprises a pin releasably mounting said bracket means on the bicycle frame, and spring-biased detent means associated with said pin for releasably retaining said pin on said bicycle frame.

9. In combination, a bicycle, a motor for propelling the bicycle, said motor including an ignition switch operable between "on" and "off" positions, a control member manually movable between power engaging and disengaging positions and being effective in the power engaging position to develop a power transmitting relationship between the motor and the wheel of the bicycle and in the disengaging position to avoid a power transmitting relationship between the motor and bicycle wheel, a latch movable between operative and inoperative positions, said latch in its operative position releasably maintaining said control member in its power disengaging position and in its inoperative position allowing said control member to assume its power engaging position respectively, and means for simultaneously shifting said ignition switch and said latch between said "on" and "off" positions and said operative and inoperative positions, respectively, said shifting means being operative on said switch and latch independently of the position of said control member.

10. The combination set forth in claim 9, wherein said shifting means is constructed and arranged to move said switch from its "on" to "off" positions while allowing said latch to remain in said inoperative position, whereby said motor is enabled to compression-brake said bicycle.

11. The combination as set forth in claim 10, wherein said latch is resiliently biased to said operative position, said shifting means being arranged to overcome the resilient bias on said latch when said latch is moved to its inoperative position.

12. The combination as set forth in claim 11, wherein said shifting means is operative on said latch through a pair of abutting surfaces movable in unison in one direction to the inoperative position of the latch and separable in a direction towards the operative position of the latch.

13. The combination as set forth in claim 12, wherein the power transmitting relationship between said motor and said bicycle is controlled by a handle, said latch being constructed and arranged to releasably keep said handle in said inoperative position.

14. A combination as set forth in claim 13, wherein said shifter is mounted on said handle.

15. A combination as set forth in claim 14, wherein said motor is fixed relative to said handle.

* * * * *